(12) United States Patent
Farooq et al.

(10) Patent No.: US 9,777,516 B2
(45) Date of Patent: Oct. 3, 2017

(54) GESTURE-ACTIVATED HOOD RELEASE SYSTEM

(71) Applicant: FORD GLOBAL TECHNOLOGIES, LLC, Dearborn, MI (US)

(72) Inventors: Iskander Farooq, Novi, MI (US); Mark A. Cuddihy, New Boston, MI (US); Manoharprasad K. Rao, Novi, MI (US)

(73) Assignee: Ford Global Technologies, LLC, Dearborn, MI ( * ) Notice: Subject to any disclaimer, the term of this patent is extended or adjusted under 35 U.S.C. 154(b) by 129 days.

(21) Appl. No.: 14/833,737

(22) Filed: Aug. 24, 2015

(65) Prior Publication Data

US 2017/0058575 A1    Mar. 2, 2017

(51) Int. Cl.
| | |
|---|---|
| *G05D 1/00* | (2006.01) |
| *E05B 83/24* | (2014.01) |
| *E05B 47/00* | (2006.01) |
| *E05B 81/58* | (2014.01) |
| *B60R 25/20* | (2013.01) |

(52) U.S. Cl.
CPC .......... *E05B 81/77* (2013.01); *B60R 25/2045* (2013.01); *B60R 25/2054* (2013.01); *E05B 47/0001* (2013.01); *E05B 81/58* (2013.01); *E05B 83/24* (2013.01); *E05B 2047/0056* (2013.01)

(58) Field of Classification Search
CPC ...... E05B 81/77; E05B 47/0001; E05B 81/58; E05B 2047/0056; B60R 16/037

USPC ..................................................... 701/36, 49
See application file for complete search history.

(56) References Cited

U.S. PATENT DOCUMENTS

| | | |
|---|---|---|
| 2002/0126876 A1 | 9/2002 | Paul et al. |
| 2006/0047386 A1 | 3/2006 | Kanevsky et al. |
| 2010/0237632 A1* | 9/2010 | Browne .............. E05B 47/0009 292/201 |
| 2013/0204457 A1 | 8/2013 | King et al. |
| 2014/0081521 A1 | 3/2014 | Frojdh et al. |

FOREIGN PATENT DOCUMENTS

WO    2014041955 A1    3/2014

OTHER PUBLICATIONS

Andreas Zinnen, "Spotting Human Activities and Gestures in Continuous Data Streams," Jul. 7, 2009.
English translation of WO2014041955A1.

* cited by examiner

*Primary Examiner* — Gertrude Arthur Jeanglaude
(74) *Attorney, Agent, or Firm* — Jason Rogers; King & Schickli, PLLC

(57) ABSTRACT

A gesture-activated hood release system for a motor vehicle is provided. That system incorporates a gesture sensor, a first actuator and a second actuator. Further, the system includes a controller that is responsive to the gesture sensor to activate the first actuator and open a primary hood latch and then, after a predetermined time delay, activate the second actuator and open the secondary hood latch.

20 Claims, 6 Drawing Sheets

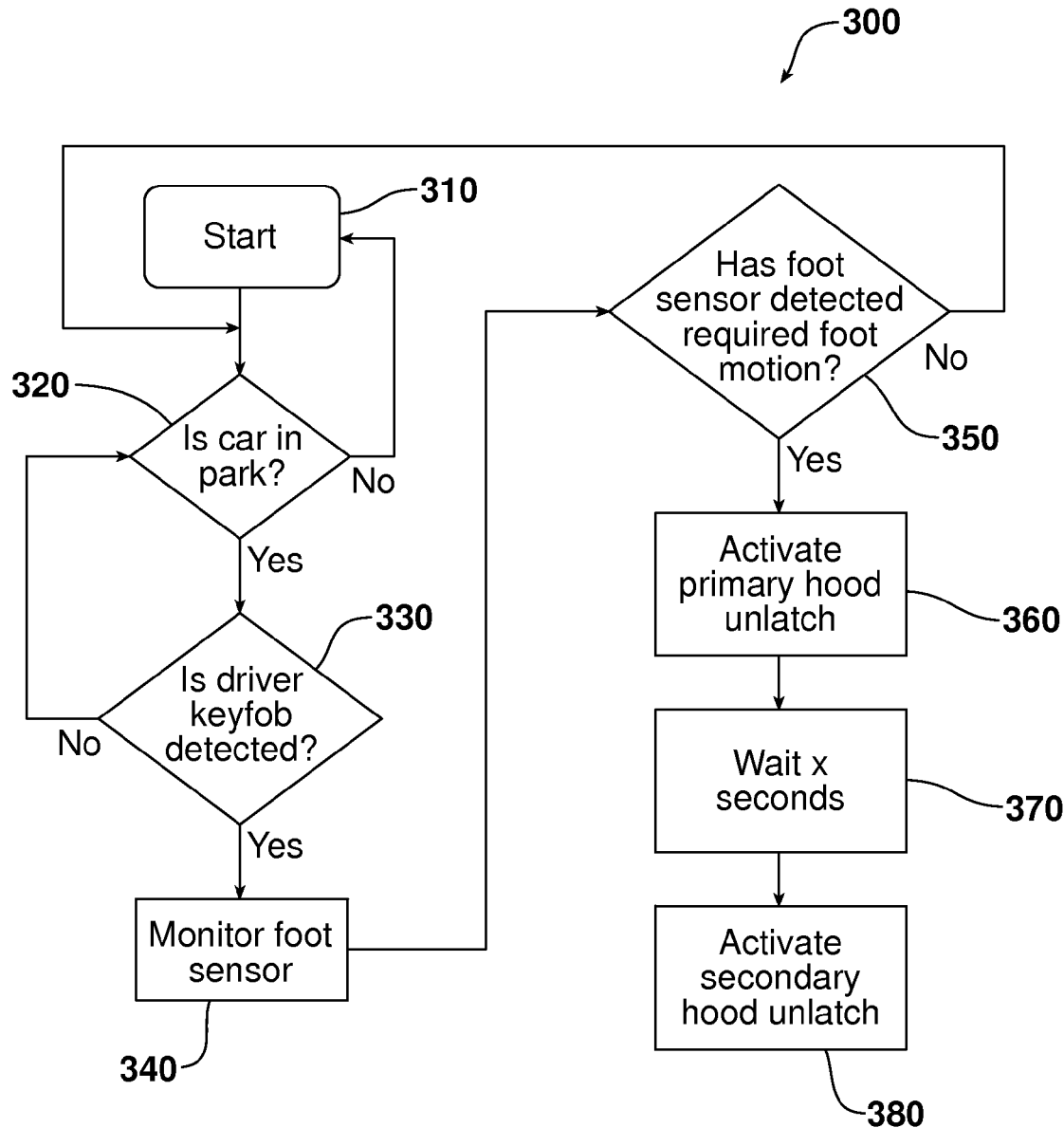

GESTURE-ACTIVATED HOOD RELEASE SYSTEM

TECHNICAL FIELD

This document relates generally to the motor vehicle equipment and, more particularly, to a gesture-activated hood release system for a motor vehicle and an associated method of opening a hood of a motor vehicle.

BACKGROUND

One must often open the hood of a motor vehicle in order to perform periodic service and maintenance such as checking and topping off fluid levels. In winter months, one needs to top off the windshield washer fluid every few weeks. On cold and snow days, motor vehicle operators would like to be able to open the hood quickly to perform needed maintenance or repairs.

While the primary hood release is often conveniently located within the motor vehicle, the secondary hood release is often difficult to locate. In many vehicles, the secondary hood release is partially if not fully, concealed by the hood or another component of the motor vehicle body. At night or in low ambient light conditions, the location of the lever is even more difficult than usual to identify.

This document relates to a new and improved gesture-activated hood release system where a motor vehicle hood is opened in response to a gesture of the motor vehicle operator by means of an electronic control system. This makes opening the hood of the motor vehicle easy and convenient, thereby greatly enhancing the satisfaction of the vehicle operator.

SUMMARY

In accordance with the purposes and benefits described herein, a gesture-activated hood release system for opening a motor vehicle hood is provided. That system comprises a first actuator connected to a primary hood latch, a second actuator connected to a secondary hood latch, a sensor for sensing an operator gesture and a controller. The controller is configured to activate the first actuator to release the primary hood latch and then activate the second actuator to release the secondary hood latch in response to a signal from the sensor.

In one possible embodiment, the controller includes a timer for delaying activation of the second actuator for a predetermined period of time following activation of the first actuator. In one possible embodiment, the controller is configured to include a wheel status input for receiving data respecting the rotation state of at least one wheel of the motor vehicle.

In one possible embodiment, the controller is configured to include a transmission status input for receiving data respecting a transmission state of the motor vehicle. In one possible embodiment, the controller is configured to include an authorized operator input for confirming the presence of an authorized operator adjacent the motor vehicle. In one possible embodiment, the first actuator and the second actuator are linear actuators.

In one possible embodiment, the sensor mounted on a front section of the motor vehicle is adjacent the hood. The sensor may take one of many forms including, for example, a proximity sensor, an infrared (IR) sensor or a digital camera.

In one possible embodiment, the gesture-activated hood release system described herein supplements manual hood release controls of a state-of-the-art motor vehicle. In another possible embodiment, the gesture-activated hood release system described herein replaces the manual release controls of a state-of-the-art motor vehicle.

In accordance with an additional aspect, a motor vehicle is provided incorporating the gesture-activated hood release system as set forth in this document.

In accordance with yet another aspect, a method is provided for opening the hood of a motor vehicle. That method comprises: (a) sensing, by sensor, an operator gesture, (b) releasing, by controller and cooperating actuators, a primary hood latch followed by (c) releasing a secondary hood latch opening the hood. In one possible embodiment, the method further includes confirming electronically that the motor vehicle is at rest before releasing the primary hood latch and the secondary hood latch. In one possible embodiment, the method further includes confirming electronically that the transmission of the motor vehicle is in park before releasing the primary hood latch and the secondary hood latch. Further, in one possible embodiment, the method includes confirming electronically that an authorized user of the motor vehicle is present before releasing the primary hood latch and the secondary hood latch.

In the following description, there are shown and described several preferred embodiments of the gesture-activated hood release system. As it should be realized, the gesture-activated hood release system is capable of other, different embodiments and its several details are capable of modification in various, obvious aspects all without departing from the gesture-activated hood release system as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the gesture-activated hood release system and together with the description serve to explain certain principles thereof. In the drawing figures:

FIG. 3 is a schematic block diagram illustrating the operation of the gesture-activated hood release system.

Figure 1A:
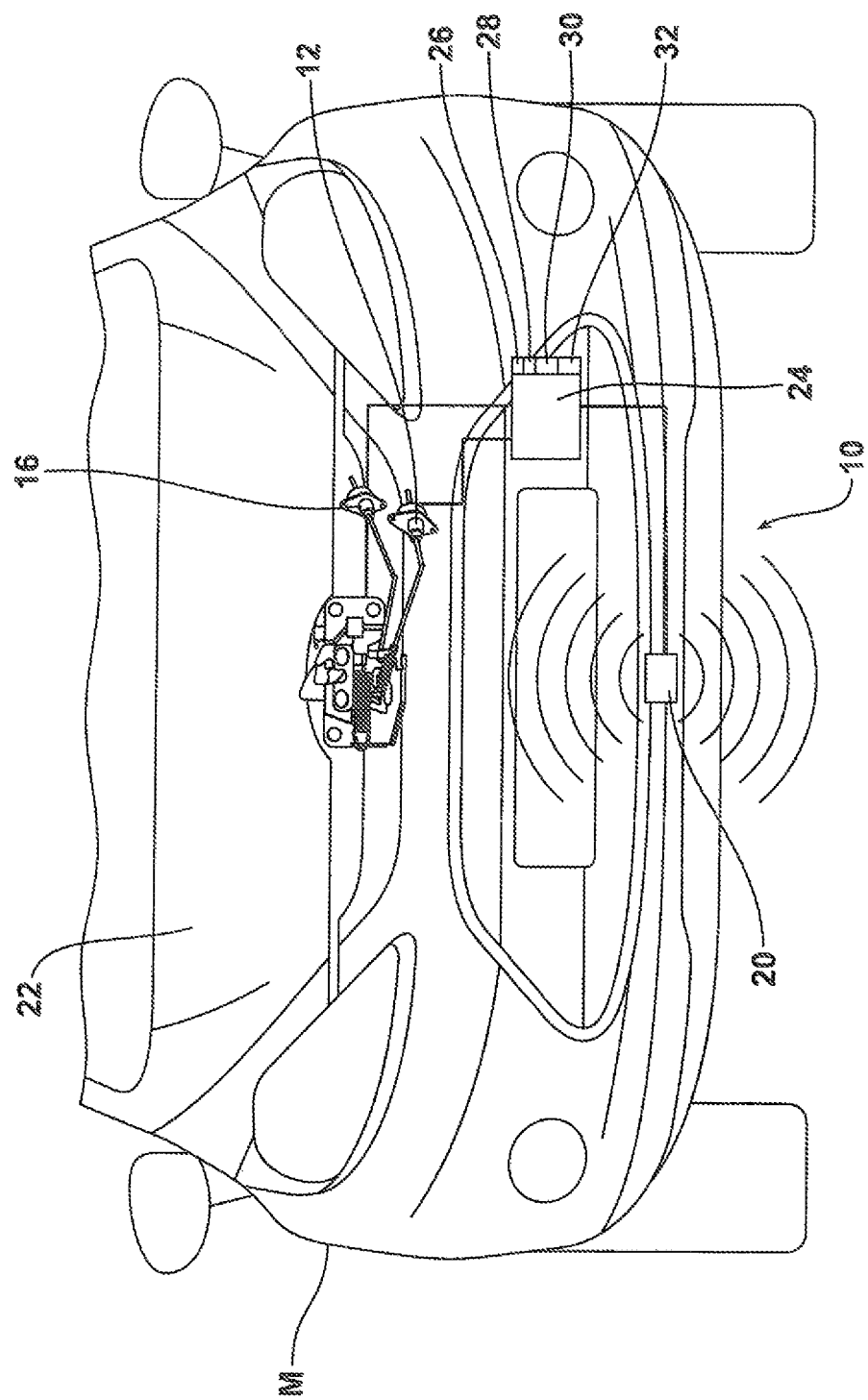
FIG. 1A is a schematic diagram of the gesture-activated hood release system that is the subject matter of this document.

Reference will now be made in detail to the present preferred embodiments of the gesture-activated hood release system, examples of which are illustrated in the accompanying drawing figures.

DETAILED DESCRIPTION

Reference is now made to FIGS. 1A, 1B, 2A, 2B and 2C schematically illustrating the gesture-activated hood release system 10 that is the subject matter of this document. That gesture-activated hood release system 10 includes a first actuator 12 connected to the primary hood latch 14, a second actuator 16 connected to the secondary hood latch 18 and a sensor 20 for sensing an operator gesture. The sensor 20 may take substantially any appropriate form including, but not limited to, a proximity sensor, an IR-sensor or a digital camera. As should be appreciated, in the illustrated embodiment, the sensor 20 is mounted on a front section of the motor vehicle adjacent the hood 22.

Figure 1B:
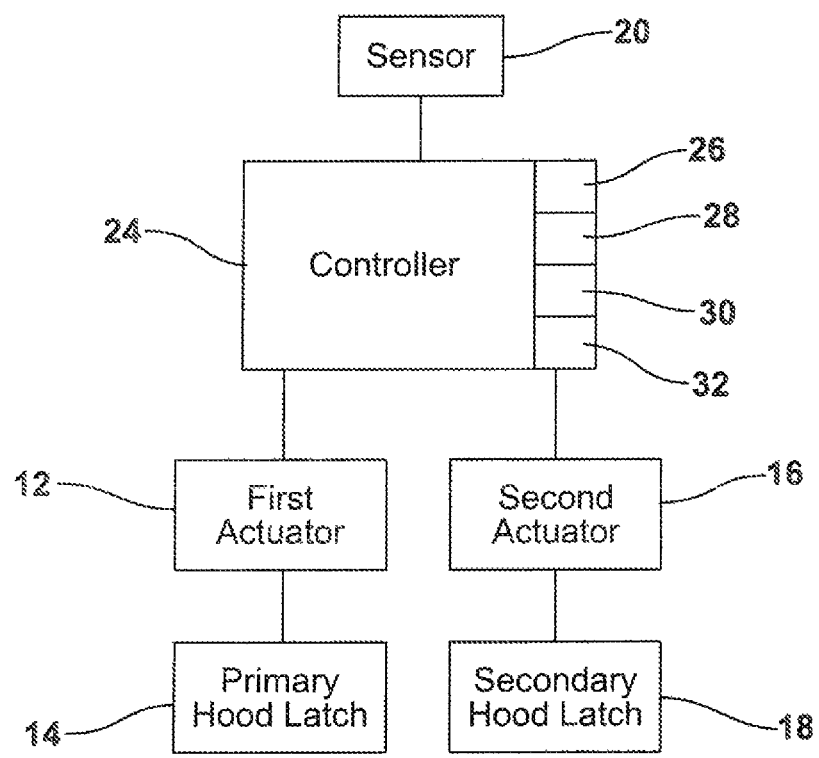
FIG. 1B is a schematic block diagram of the control system for the gesture-activated hood release system illustrated in FIG. 1A.
Figure 2A:
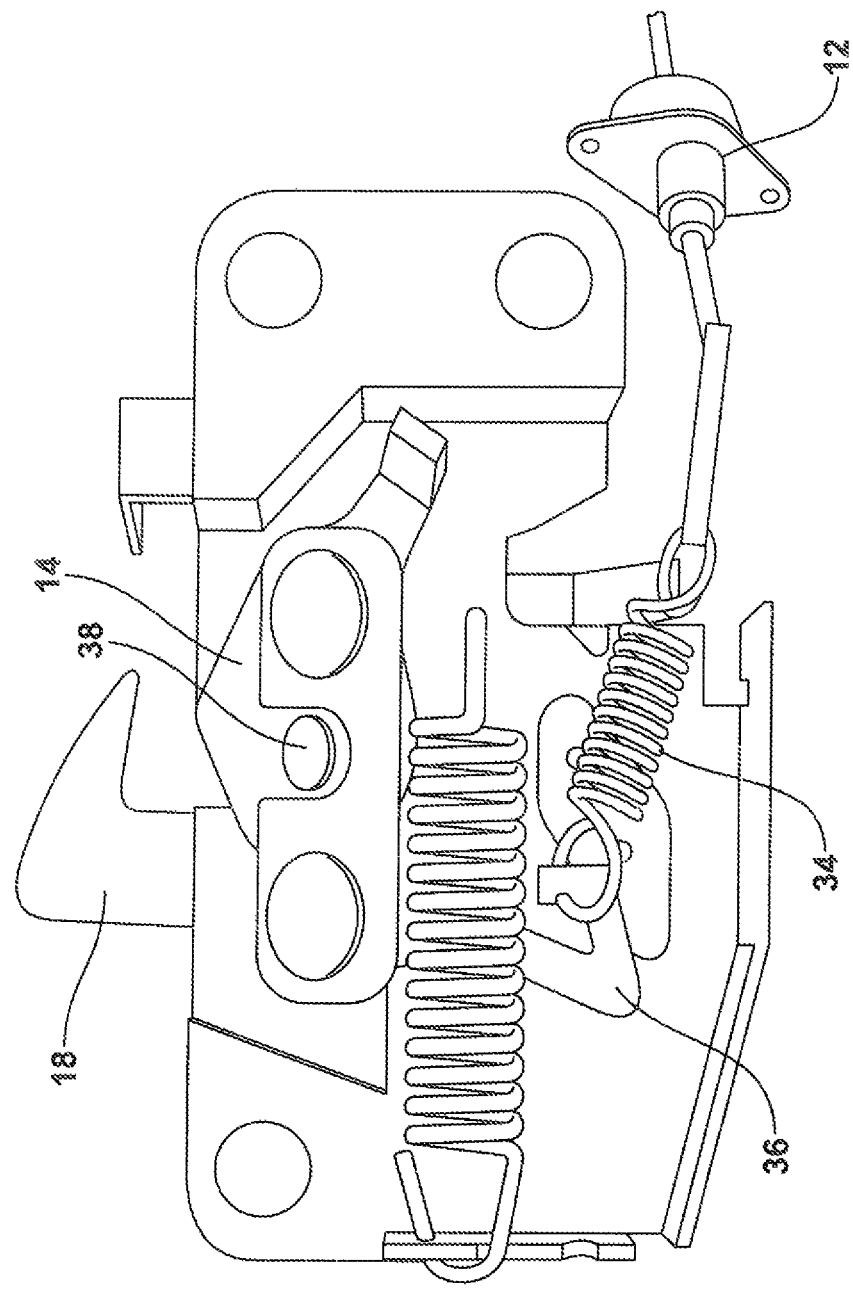
FIGS. 2A-2C are schematic illustrations illustrating the operation of the gesture-activated hood release system which first releases the primary hood latch and then releases the secondary hood latch to allow the opening of the hood.
Figure 2B:
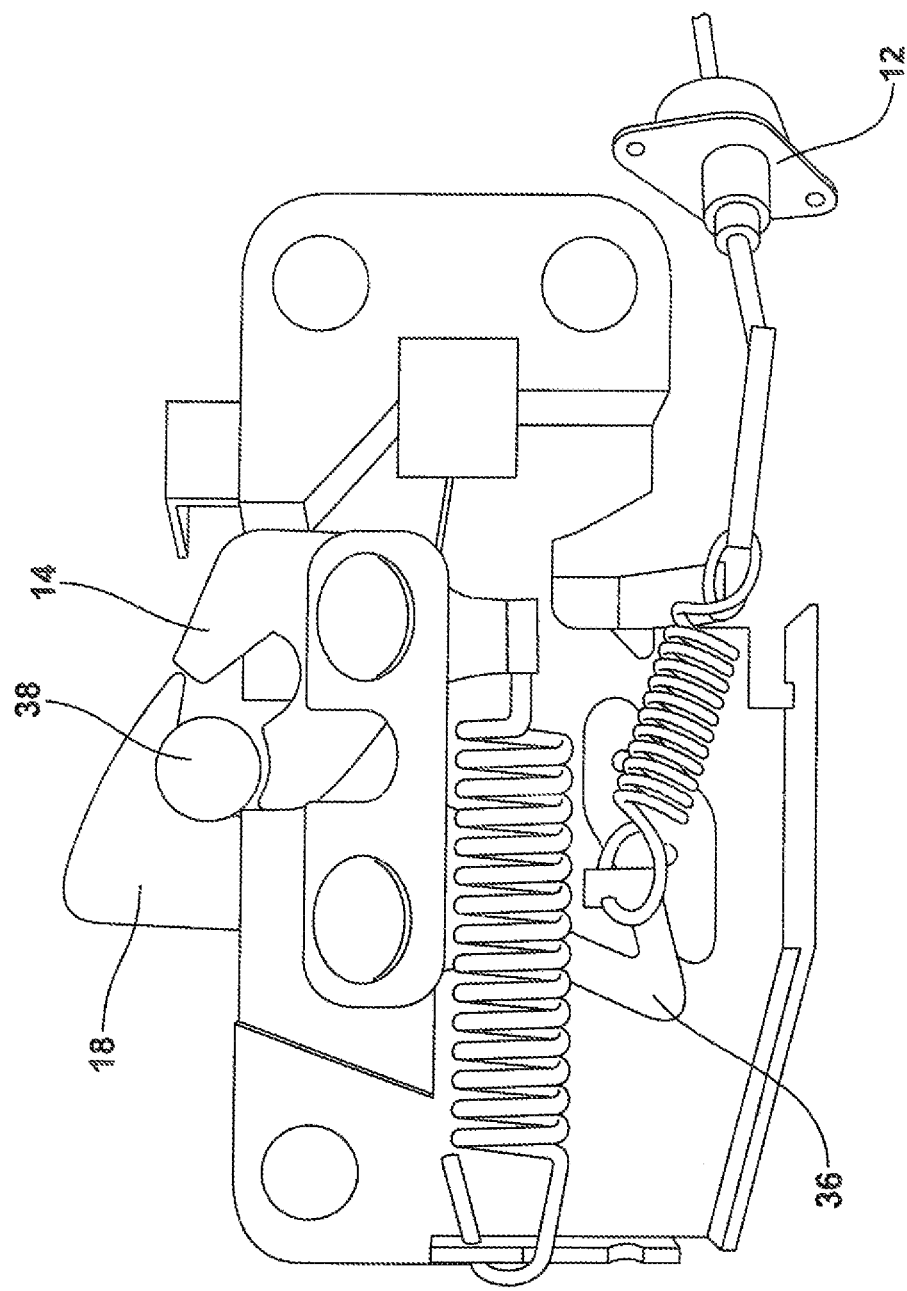
Figure 2C:
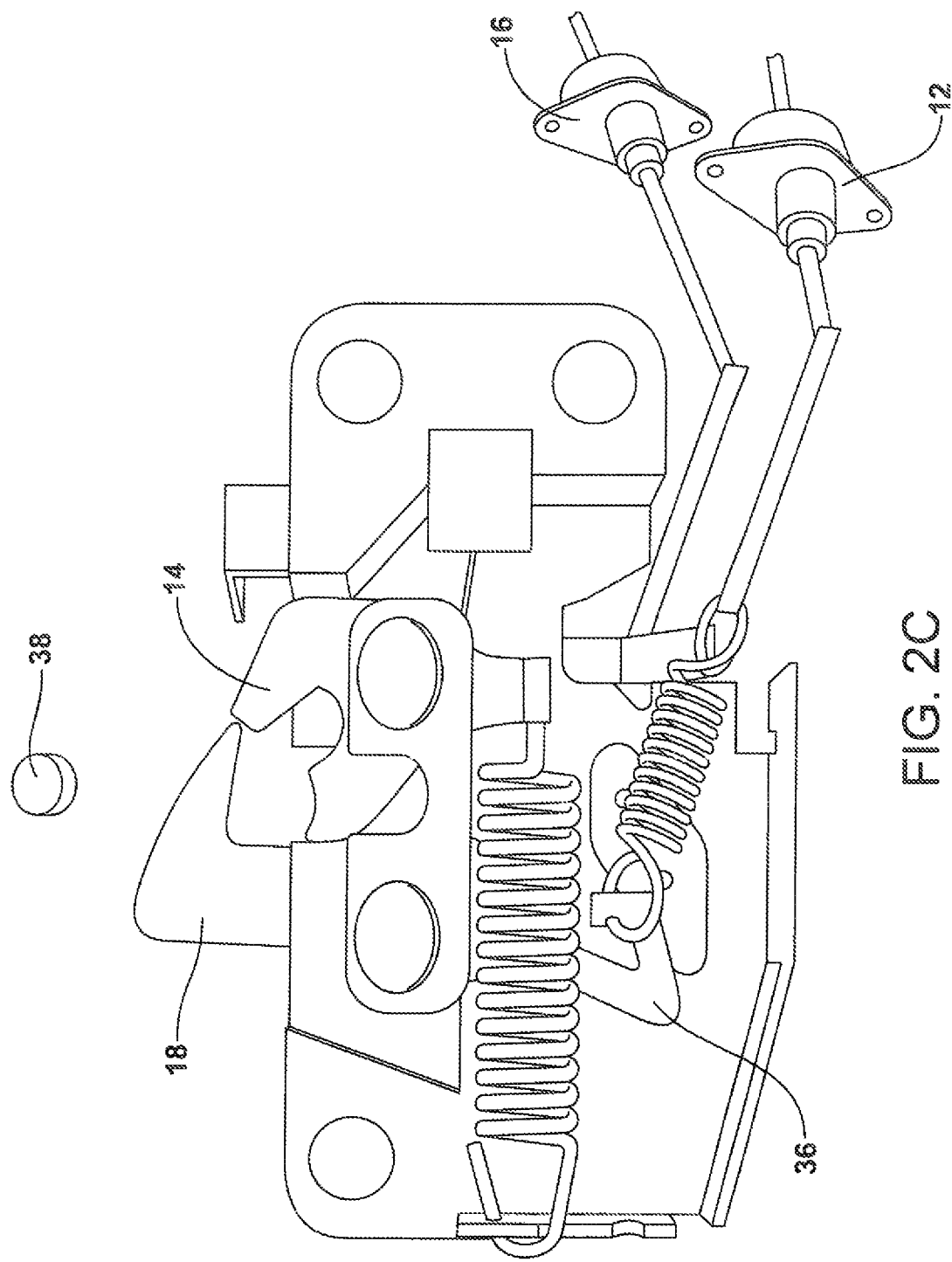

As further illustrated in FIGS. 1A and 1B, the gesture-activated hood release system 10 also includes a controller 24. The controller 24 may take the form of a computing device, such as a dedicated microprocessor or electronic control unit (ECU) incorporating appropriate control software. Thus, the controller 24 may include one or more processors, one or more memories and one or more network interfaces all communicating with each other over a communication bus. In any of the embodiments, the controller 24 is configured to activate the first actuator 12 to release the primary hood latch 14 and then activate the second actuator 16 to release the secondary hood latch 18 in response to an appropriate signal received from the sensor 20.

As best illustrated in FIG. 1B, the controller 24 is configured to include a timer 26 for delaying activation of the second actuator 16 for a predetermined period of time following activation of the first actuator 12. This ensures that the second actuator 16 is activated at the proper moment to provide for release of the secondary hood latch 18 and the opening of the hood 22.

As further illustrated in FIG. 1B, the controller 24 is configured to include a wheel status input 28 for receiving data respecting a rotation state of at least one wheel of the motor vehicle. Accordingly, it should be appreciated that the wheel data must indicate that the wheel is stationary and, therefore, that the motor vehicle is at rest, before the controller 24 will activate the first and second actuators 12, 16 to open the primary and secondary hood latches 14, 18.

The controller 24 is also configured to include a transmission status input 30 for receiving data respecting a transmission state of the motor vehicle. Thus, for a motor vehicle with an automatic transmission it should be appreciated that the transmission must be in park before the controller 24 will activate the first and second actuators 12, 16 to release the primary and secondary hood latches 14, 18.

Still further, the controller 24 is configured to include an authorized operator input 32 for confirming the presence of an authorized operator adjacent the motor vehicle. Accordingly, the controller 24 will only activate the first and second actuators 12, 16 in response to the sensor 20 detecting an appropriate gesture while simultaneously receiving data at the input 32 from the body control module of the motor vehicle (not shown) which detects the presence of an authorized operator through a specifically coded key fob or the like.

The method of operation of the gesture-activated hood release system 10 will now be described with reference to FIGS. 2A-2C and 3. Following system activation, the controller 24 checks the wheel status input 28 and/or the transmission status input 30 to confirm that the wheel is stationary and the motor vehicle is at rest and/or the transmission is in the park state. If the status of the inputs 28, 30 is in the affirmative, the controller 24 then checks the authorized operator input 32 to determine if the authorized operator is present. This can be done by means of the detection of the driver key fob that is specifically coded to the motor vehicle. If these preliminary status requirements are met, the controller next monitors input from the sensor 20. In the event the sensor 20 detects an appropriate gesture made by the operator adjacent the front of the motor vehicle, a signal is sent from the sensor to the controller 24 which then activates the first actuator 12. Once activated, the actuator 12, which may be a linear actuator, pulls the spring 34 (or pushes, depending on the latch design) attached to the primary hood latch lever 36. This releases the hood striker 38 from the primary latch 14. As a result, the hood striker 38 is now engaged by the secondary hood latch 18.

After a short delay of a predetermined period of time, for example, five seconds as marked by the timer 26, the controller 24 activates the second actuator 16. Once activated, the second actuator 16, which may also be a linear actuator, pulls, pushes or swings open (as appropriate for the particular latch design) the secondary latch 18 and the hood striker 38 is released. This allows the hood 22 to fully open under the force exerted by the hood gas struts (not shown). Thus, it should be appreciated the hood 22 may be fully opened in a convenient and efficient manner without the vehicle operator ever having to activate any switch or lever or even contact the hood 22 in any manner. Further, the hood 22 is opened quickly without substantial delay, which is a great benefit in inclement weather conditions. Further, the system 10 can eliminate any need to locate a secondary hood release which is often concealed under body or fascia components of the motor vehicle and may be particularly difficult to find in low ambient light conditions.

FIG. 3 shows a block diagram of a process 300 for implementing an embodiment of the proposed system. The process starts at block 310 and the vehicle transmission or park status is assessed in block 320. If the vehicle is determined to be in park, a determination is then made if the driver's keyfob is detected at block 330. In the event the keyfob is detected, the controller 24 then monitors the data input from the sensor or sensors 20 that detect the required gesture or foot movement (See blocks 340 and 350). If the gesture/foot movement is detected, the controller 24 activates the primary hood unlatch at block 360, waits the necessary amount of time at block 370 and then activates the secondary hood unlatch at block 380, opening the hood.

Thus, it should be appreciated the gesture-activated hood release system 10 is characterized by a method of opening a hood 22 of the motor vehicle M, which may be broadly described as including the steps of: (a) sensing, by sensor, an operator gesture, (b) releasing, by and cooperating actuators, a primary hood latch followed by releasing a secondary hood latch and opening the hood. Further, the method may include confirming electronically that the motor vehicle M is at rest before releasing the primary hood latch 14 and the secondary hood latch 18. In addition, the method may include confirming electronically that the transmission of the motor vehicle is in park before releasing the primary hood latch 14 and the secondary hood latch 18. Further, the method may include confirming electronically that an authorized user of the motor vehicle is present before releasing the primary hood latch 14 and the secondary hood latch 18.

The foregoing has been presented for purposes of illustration and description. It is not intended to be exhaustive or to limit the embodiments to the precise form disclosed. Obvious modifications and variations are possible in light of the above teachings. For example, the motor vehicle hood opening system 10 may supplement manual hood release controls of a state of the art motor vehicle M. Alternatively, the motor vehicle hood opening system 10 may replace manual hood release controls of a state of the art motor vehicle.

As an additional example, in some embodiments the primary hood latch may be opened manually by means of a release lever from the interior of the vehicle via current manual hood release controls. The secondary latch may then be opened by means of a gesture activated hood release system 10, comprising the sensor 20, the controller 24 and the second actuator 16. In such an embodiment, the controller 24 would be configured to (a) include data inputs 28, 30 and 32 for wheel status, transmission status and authorized operator presence and (b) activate the actuator 16 to release the secondary hood latch in response to a signal from the sensor 20.

All such modifications and variations are within the scope of the appended claims when interpreted in accordance with the breadth to which they are fairly, legally and equitably entitled.

What is claimed:

1. A gesture-activated hood release system, comprising:
a first actuator connected to a primary hood latch;
a second actuator connected to a secondary hood latch;
a sensor for sensing an operator gesture; and
a controller configured to activate said first actuator to release said primary hood latch and then activate said second actuator to release said secondary hood latch in response to a signal from said sensor.

2. The gesture-activated hood release system of claim 1 wherein said controller is configured to include a timer for delaying activation of said second actuator for a predetermined period of time following activation of said first actuator.

3. The gesture-activated hood release system of claim 2, wherein said controller is configured to include a wheel status input for receiving data respecting a rotation state of at least one wheel of said motor vehicle.

4. The gesture-activated hood release system of claim 3, wherein said controller is configured to include a transmission status input for receiving data respecting a transmission state of said motor vehicle.

5. The gesture-activated hood release system of claim 4, wherein said controller is configured to include an authorized operator input for confirming the presence of an authorized operator adjacent the motor vehicle.

6. The gesture-activated hood release system of claim 5 wherein said first actuator and said second actuator are linear actuators.

7. The gesture-activated hood release system of claim 1, wherein said sensor is mounted on a front section of said motor vehicle adjacent said hood.

8. The gesture-activated hood release system of claim 7, wherein said sensor is a proximity sensor.

9. The gesture-activated hood release system of claim 7, wherein said sensor is an IR-sensor.

10. The gesture-activated hood release system of claim 7, wherein said sensor is a digital camera.

11. The gesture-activated hood release system of claim 7, wherein said motor vehicle hood release system supplements manual hood release controls of a state of art motor vehicle.

12. The gesture-activated hood release system of claim 7, wherein said motor vehicle hood release system replaces manual hood release controls of a state of art motor vehicle.

13. A motor vehicle incorporating said gesture-activated hood release system as set forth in claim 1.

14. A gesture-activated hood release system, comprising:
a gesture sensor;
an actuator; and
a controller responsive to said gesture sensor to activate said actuator and open a secondary hood latch.

15. A method of opening a hood of a motor vehicle, comprising:
sensing, by sensor, an operator gesture;
releasing, by controller and cooperating actuators, a primary hood latch followed by a secondary hood latch; and
opening said hood.

16. The method of claim 15 including confirming electronically said motor vehicle is at rest before releasing said primary hood latch and said secondary hood latch.

17. The method of claim 16 including confirming electronically a transmission of said motor vehicle is in park before releasing said primary hood latch and said secondary hood latch.

18. The method of claim 17 including confirming electronically that an authorized user of said motor vehicle is present before releasing said primary hood latch and said secondary hood latch.

19. The method of claim 15 including confirming electronically a transmission of said motor vehicle is in park before releasing said primary hood latch and said secondary hood latch.

20. The method of claim 15 including confirming electronically that an authorized user of said motor vehicle is present before releasing said primary hood latch and said secondary hood latch.

* * * * *